United States Patent
Song et al.

(10) Patent No.: US 8,816,526 B2
(45) Date of Patent: Aug. 26, 2014

(54) AUTOMOTIVE LAMP DEVICE

(75) Inventors: Hae-Seok Song, Gyeongbuk (KR);
Dae-Kyu Kim, Gyeongbuk (KR);
Eun-Sang Yu, Gyeongbuk (KR)

(73) Assignee: SL Corporation, Daegu (KR)

( * ) Notice: Subject to any disclaimer, the term of this patent is extended or adjusted under 35 U.S.C. 154(b) by 742 days.

(21) Appl. No.: 12/885,184

(22) Filed: Sep. 17, 2010

(65) Prior Publication Data

US 2011/0074294 A1    Mar. 31, 2011

(30) Foreign Application Priority Data

Sep. 25, 2009  (KR) .................. 10-2009-0091237

(51) Int. Cl.
*B60L 1/14* (2006.01)
*B60Q 1/00* (2006.01)
*B60Q 1/14* (2006.01)

(52) U.S. Cl.
CPC .......... *B60Q 1/0094* (2013.01); *B60Q 2900/10* (2013.01); *B60Q 1/14* (2013.01); *Y10S 362/80* (2013.01)
USPC ....... 307/10.8; 307/10.1; 307/10.7; 307/10.2; 307/9.1; 362/544; 362/475; 362/800; 315/247; 315/224

(58) Field of Classification Search
USPC .......... 307/10.8, 10 R, 10 LS; 313/111, 110, 313/117, 355, 501, 498, 502; 439/488, 489, 439/595, 761, 538, 537; 362/545, 518, 240, 362/241; 315/224, 129, 308, 307; 363/15, 363/21.11
See application file for complete search history.

(56) References Cited

U.S. PATENT DOCUMENTS

| | | | | |
|---|---|---|---|---|
| 4,295,052 | A | * | 10/1981 | Jochmann et al. ........... 307/10.1 |
| 5,258,686 | A | * | 11/1993 | Segoshi et al. ................ 313/313 |
| 6,056,589 | A | * | 5/2000 | Endo et al. .................... 439/488 |
| 6,586,890 | B2 | * | 7/2003 | Min et al. ...................... 315/224 |
| 7,188,984 | B2 | * | 3/2007 | Sayers et al. .................. 362/545 |
| 7,777,405 | B2 | * | 8/2010 | Steen et al. .................... 313/501 |
| 2002/0039297 | A1 | * | 4/2002 | Kodaira et al. ............... 362/475 |

FOREIGN PATENT DOCUMENTS

JP        2006206001        10/2006

* cited by examiner

*Primary Examiner* — Jared Fureman
*Assistant Examiner* — Jagdeep Dhillon
(74) *Attorney, Agent, or Firm* — Edwards Wildman Palmer LLP (57) ABSTRACT

An automotive lamp device is provided. The automotive lamp device includes a lamp housing into which a first lamp or a second lamp is inserted and which includes a plurality of lines, and a lamp driver module which is connected to a first line among the plurality of lines, supplies a first level of voltage and/or current to the first lamp if the first lamp is inserted into the lamp housing, and supplies a second level of voltage and/or current to the second lamp if the second lamp is inserted into the lamp housing.

8 Claims, 9 Drawing Sheets

Fig. 9b

AUTOMOTIVE LAMP DEVICE

This application claims priority from Korean Patent Application No. 10-2009-0091237 filed on Sep. 25, 2009 in the Korean Intellectual Property Office, and all the benefits accruing therefrom under 35 U.S.C. 119, the contents of which in its entirety are herein incorporated by reference.

BACKGROUND

1. Field of the Invention

The present invention relates to an automotive lamp device, and more particularly to an automotive lamp device capable of stably operating regardless of the specification of an LED included in a lamp.

2. Description of the Related Art

In general, a vehicle includes various automotive lamp devices having a lighting function for enabling a driver to easily recognize objects around the vehicle and a signaling function for informing a driver in another vehicle or a pedestrian of a driving state of the vehicle. For example, among various automotive lamps, a headlight and a fog light are used to provide a lighting function, and a blinker, a stop lamp and a position lamp are used to provide a signaling function.

The automotive lamp for providing a lighting function generally employs a projection lamp, which is itself formed into a unit. Further, in order to improve space efficiency, a lamp serving as a position lamp is additionally used in a housing of the projection lamp. Generally, in case where a position lamp is additionally used in a housing of the projection lamp, an incandescent lamp serving as a position lamp is embedded in the housing. In this case, a space for embedding the incandescent lamp serving as a position lamp is additionally required, thereby limiting the design flexibility of the lamp. Further, the incandescent lamp should be frequently replaced with a new one due to its limited life span. Furthermore, since an inner temperature of the incandescent lamp serving as a position lamp increases due to heat generated in the incandescent lamp, the reliability of the incandescent lamp cannot be guaranteed.

Accordingly, an LED instead of the incandescent lamp is recently used as a position lamp to solve the problems caused by using the incandescent lamp. For example, in case of using an LED instead of the incandescent lamp as a position lamp, it is possible to enhance the design flexibility of the lamp because the LED occupies a small space and the LED can be used semi-permanently due to its long life span.

However, LEDs are produced to have different specifications according to the manufacturing processes. Accordingly, in case of using LEDs having different specifications in the lamp, it is required to change a lamp driver module to supply appropriate voltages and/or currents to the lamp; otherwise, the automotive lamp device may not be stably operated.

SUMMARY

The present invention provides an automotive lamp device capable of stably operating.

The above and other objects of the present invention will be described in or be apparent from the following description of the embodiments.

According to an aspect of the present invention, there is provided an automotive lamp device including a lamp housing into which a first lamp or a second lamp is inserted and which includes a plurality of lines, and a lamp driver module which is connected to a first line among the plurality of lines, supplies a first level of voltage and/or current to the first lamp if the first lamp is inserted into the lamp housing, and supplies a second level of voltage and/or current to the second lamp if the second lamp is inserted into the lamp housing.

According to another aspect of the present invention, there is provided an automotive lamp device including a lamp housing into which an LED light source is inserted, a driver circuit for supplying a voltage and/or current to the LED light source, and a setting unit for setting the driver circuit to supply different levels of voltages and/or currents according to specifications of the LED light source.

The automotive lamp device in accordance with the aspects of the present invention can stably operate without changing the lamp driver module in case of using the lamp including LEDs having different specifications.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

In some embodiments, well-known steps, structures and techniques will not be described in detail to avoid obscuring the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In the drawings, respective components may be enlarged or reduced in size for convenience of explanation. Throughout the specification, like reference numerals in the drawings denote like elements.

Figure 1:
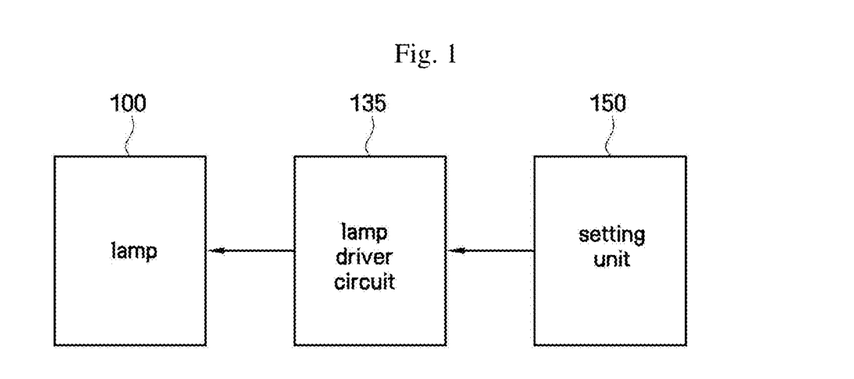
FIG. 1 illustrates a concept diagram of an automotive lamp device in accordance with embodiments of the present invention.

FIG. 1 illustrates a concept diagram of an automotive lamp device in accordance with embodiments of the present invention.

Referring to FIG. 1, the automotive lamp device in accordance with the embodiments of the present invention includes a lamp 100, a lamp driver circuit 135, a setting unit 150 and the like.

The lamp 100 has automotive lighting and signaling functions and may use a light emitting diode (LED) as a light source. For example, the lamp 100 may be a projection lamp having a lighting function or a position lamp having a signaling function. However, it is not limited thereto, and various types of lamps may be used as the lamp 100 according to the purposes and demands.

Meanwhile, in case of using an LED as a light source of the lamp 100, a normal voltage and/or a level of current required for the lamp may be changed according to the specifications of the LED (e.g., bin code). Specifically, the specification of the LED varies according to a manufacturing process.

The lamp 100 including an LED having a first specification may normally operate only when it is supplied with a first level of voltage and/or current. The lamp 100 including an LED having a second specification may normally operate only when it is supplied with a second level of voltage and/or current, the second level being different from the first level. Accordingly, if the lamp 100 is supplied with the same level of voltage and/or current regardless of the specification of the LED included in the lamp 100, the automotive lamp device may not be stably operated.

The lamp driver circuit 135 serves to supply a voltage and/or current to the lamp 100. Particularly, the lamp driver circuit 135 in accordance with the embodiments of the present invention may supply different levels of voltages and/or currents to the lamp 100 according to the specifications of the LED included in the lamp 100. Specifically, the lamp driver circuit 135 may supply a first level of voltage and/or current to the lamp 100 if the lamp 100 includes an LED having a first specification, and may supply a second level of voltage and/or current to the lamp 100 if the lamp 100 includes an LED having a second specification. Accordingly, the automotive lamp device in accordance with the embodiments of the present invention may stably operate the lamp 100 without shortage or excess of voltage and/or current required for the lamp 100 regardless of the specification of the LED included in the lamp 100.

The setting unit 150 serves to set the lamp driver circuit 135 according to the specification of the LED included in the lamp 100. Specifically, the setting unit 150 may set the lamp driver circuit 135 such that the lamp driver circuit 135 supplies a first level of voltage and/or current to the lamp 100 if the lamp 100 includes an LED having a first specification. Further, the setting unit 150 may set the lamp driver circuit 135 such that the lamp driver circuit 135 supplies a second level of voltage and/or current to the lamp 100 if the lamp 100 includes an LED having a second specification. In other words, the automotive lamp device in accordance with the embodiments of the present invention has a configuration in which the same lamp driver circuit 135 supplies different levels of voltages and/or currents to the lamp 100 according to the specifications of the LED included in the lamp 100. Consequently, although the specification of the LED included in the lamp 100 is changed, there is no need to replace the lamp driver circuit 135 with one appropriate for the changed LED specification, which may be efficient.

Figure 2:
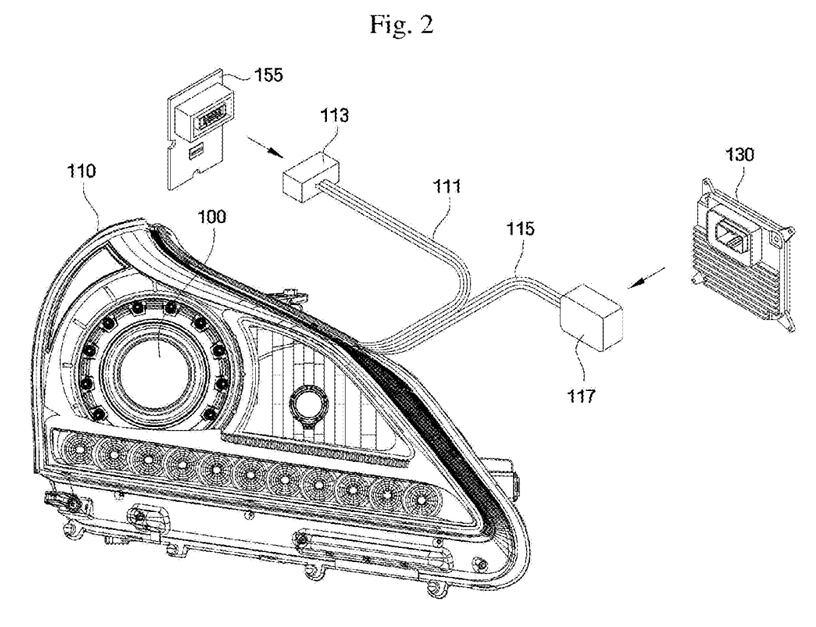
FIG. 2 illustrates an automotive lamp device in accordance with one embodiment of the present invention.
Figure 3:
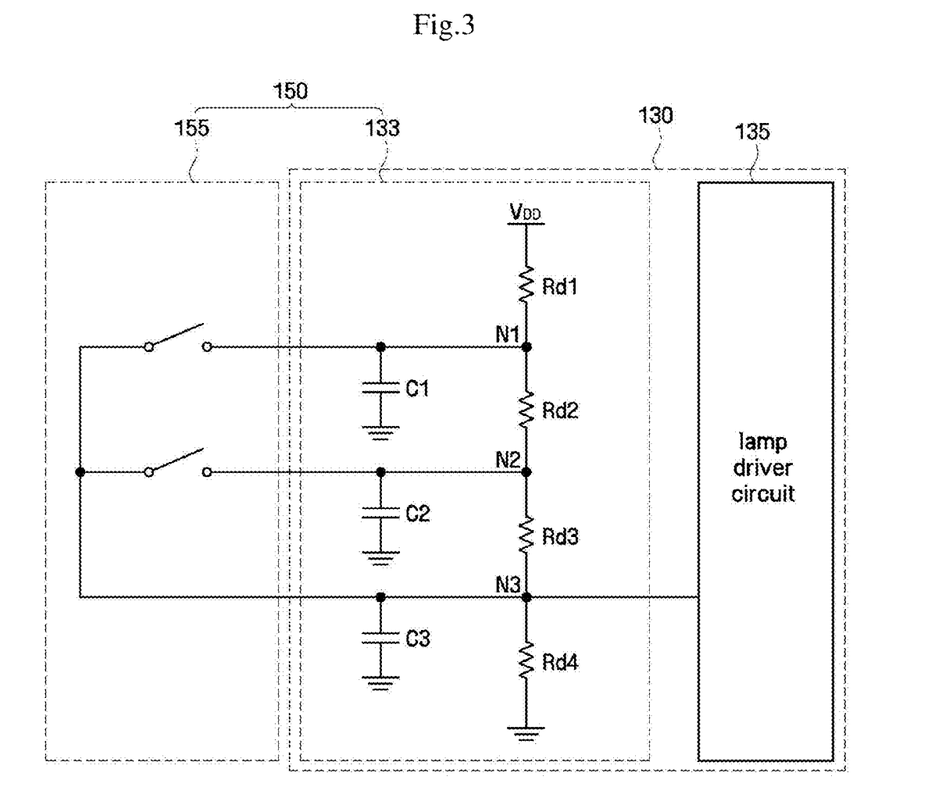
FIG. 3 illustrates a setting unit of FIG. 2.

FIG. 2 illustrates an automotive lamp device in accordance with one embodiment of the present invention. FIG. 3 illustrates the setting unit of FIG. 2.

Referring to FIGS. 2 and 3, the automotive lamp device in accordance with the embodiment of the present invention includes the lamp 100, a lamp housing 110, a lamp driver module 130, a setting connector 155 and the like.

The lamp housing 110 serves to support the lamp 100 that is inserted into the lamp housing 110. The lamp housing 110 includes a number of lines 111 and 115 for connecting the lamp 100 with the lamp driver module 130, the setting connector 155 and the like. The lines 111 and 115 may include a first line 115 connected to the lamp driver module 130 via a first connector 117 and a second line 111 connected to the setting connector 155 via a second connector 113.

If the first connector 117 of the first line 115 is of a protrusion type, a connector of the lamp driver module 130 may be of a recess type. If the first connector 117 of the first line 115 is of a recess type, the connector of the lamp driver module 130 may be of a protrusion type. Similarly, if the second connector 113 of the second line 111 is of a protrusion type, the setting connector 155 may be of a recess type. If the second connector 113 of the second line 111 is of a recess type, the setting connector 155 may be of a protrusion type. In this case, the "protrusion type connector" may be a connector including a number of protruded pins, and the "recess type connector" may be a connector including pin insertion portions, into which the protruded pins are inserted, to be electrically connected to the pins.

The lamp driver module 130 is connected to the lamp 100 via the first line 115 and serves to operate the lamp 100 by using a power supply of a vehicle. The lamp driver module 130 may include a voltage divider circuit 133 and a lamp driver circuit 135 as depicted in FIG. 3.

The voltage divider circuit 133 and the setting connector 155 form the setting unit 150 of FIG. 1. The voltage divider circuit 133 may output different voltages according to the setting connector 155 connected to the second line 111. Specifically, the voltage divider circuit 133 may include a number of string resistors Rd1 to Rd4 connected in series between a constant voltage VDD and a ground voltage and stabilization capacitors C1 to C3, each capacitor being connected to one end of the string resistors Rd1 to Rd4 to remove noise. Although the voltage divider circuit 133 includes four string resistors Rd1 to Rd4 and three stabilization capacitors C1 to C3 in the embodiment of FIG. 3, it is not limited thereto and various design changes can be made by those skilled in the art.

The lamp driver circuit 135 may supply different levels of voltages and/or currents to the lamp 100 according to output values of the voltage divider circuit 133. The detailed description thereof will be given below with reference to FIGS. 4A to 4C.

The setting connector 155 is connected to the voltage divider circuit 133 of the lamp driver module 130 via the second line 111 and the first line 115 and serves to adjust connection between the string resistors Rd1 to Rd4 included in the voltage divider circuit 133. Particularly, the setting connector 155 in accordance with the embodiment of the present invention may change its type according to the specification of the LED included in the light source.

Specifically, in case where an LED having a first specification is included in the lamp 100, a first type of the setting connector 155 may be connected to the voltage divider circuit 133 such that the string resistors Rd1 to Rd4 included in the voltage divider circuit 133 have a first type connection. Meanwhile, in case where an LED having a second specification is included in the lamp 100, a second type of the setting connector 155 may be connected to the voltage divider circuit 133 such that the string resistors Rd1 to Rd4 included in the voltage divider circuit 133 have a second type connection.

Figure 4A:
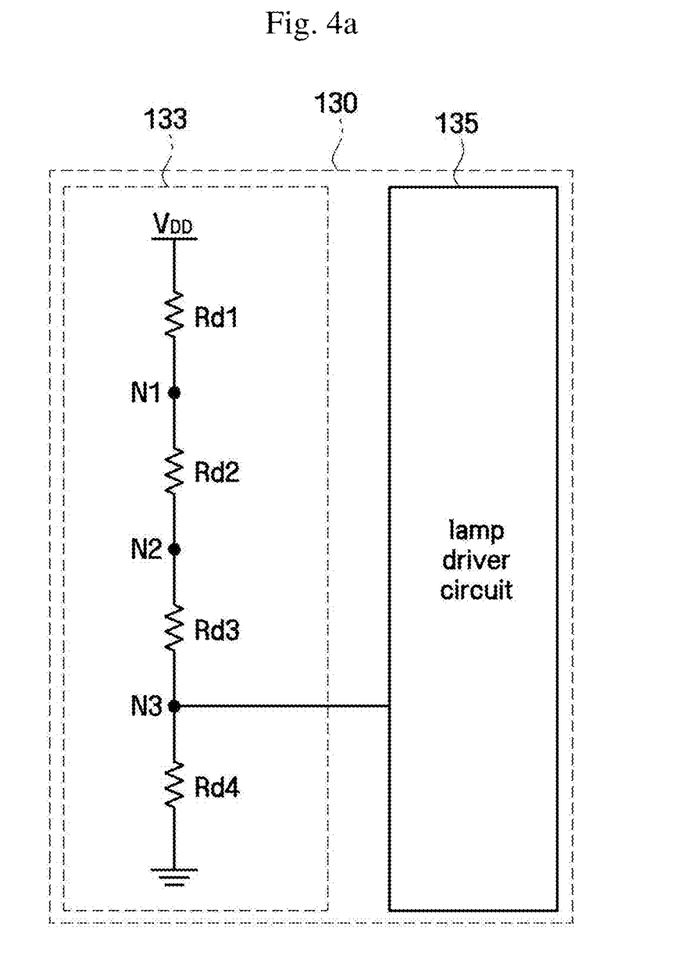
FIGS. 4A to 4C are exemplary diagrams for explaining an operation of the setting unit of FIG. 2.
Figure 4B:
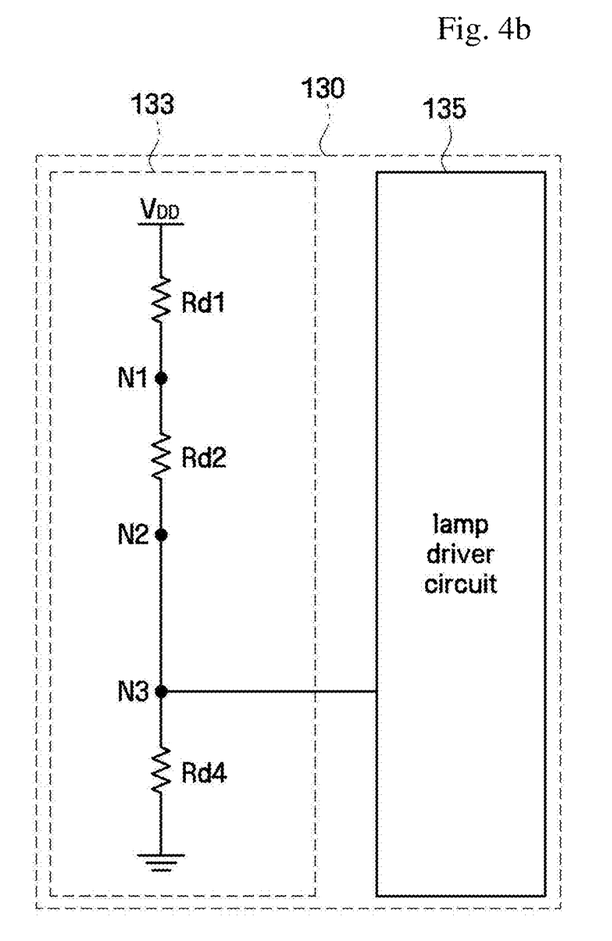
Figure 4C:
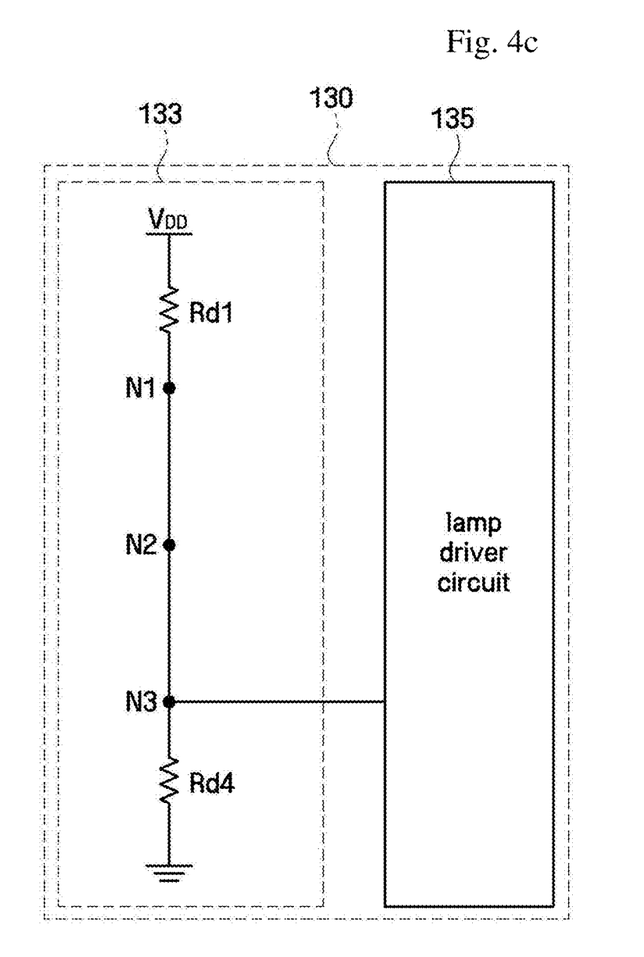

FIGS. 4A to 4C are exemplary diagrams for explaining an operation of the setting unit of FIG. 2.

First, in case where an LED having a first specification is included in the lamp, a first type of the setting connector 155 may be connected to the second connector 113. In this case, the first type of the setting connector 155 may disconnect first and second nodes N1 and N2 from a third node N3 in the voltage divider circuit 133 of FIG. 3. Accordingly, in case of the first type of the setting connector 155, the voltage divider circuit 133 of FIG. 3 may be configured as shown in FIG. 4A. That is, the string resistors Rd1, Rd2 and Rd3 may be connected between the constant voltage VDD and an output node (or the third node N3), and the output node (i.e., the third node N3) may have a voltage of VDD×Rd4/(Rd1+Rd2+Rd3+Rd4).

Meanwhile, in case where an LED having a second specification is included in the lamp, a second type of the setting connector 155 may be connected to the second connector 113. In this case, the second type of the setting connector 155 may disconnect the first node N1 from the third node N3 and connect the second node N2 with the third node N3 in the voltage divider circuit 133 of FIG. 3. Accordingly, in case of the second type of the setting connector 155, the voltage divider circuit 133 of FIG. 3 may be configured as shown in FIG. 4B. That is, the string resistors Rd1 and Rd2 may be connected between the constant voltage VDD and an output node (or the third node N3), and the output node (i.e., the third node N3) may have a voltage of VDD×Rd4/(Rd1+Rd2+Rd4).

Similarly, in case where an LED having a third specification is included in the lamp, a third type of the setting connector 155 may be connected to the second connector 113. In this case, the third type of the setting connector 155 may connect the first and second nodes N1 and N2 with the third node N3 to cause short circuits in the voltage divider circuit 133 of FIG. 3. Accordingly, in case of the third type of the setting connector 155, the voltage divider circuit 133 of FIG. 3 may be configured as shown in FIG. 4C. That is, only the string resistor Rd1 may be connected between the constant voltage VDD and an output node (or the third node N3), and the output node (i.e., the third node N3) may have a voltage of VDD×Rd4/(Rd1+Rd4).

Consequently, the voltage divider circuit 133 may provide different outputs to the lamp driver circuit 135 according to the types of the setting connector 155. Further, the lamp driver circuit 135 may supply different levels of voltages and/or currents to the lamp 100 in response thereto. Accordingly, in the automotive lamp device in accordance with the embodiment of the present invention, although the lamp of the automotive lamp device is provided with LEDs having different specifications, it is unnecessary to change the lamp driver module 130 to supply different levels of voltages and/or currents. In other words, although the lamp 100 is provided with LEDs having different specifications, the lamp 100 can be stably operated only by varying the setting connector 155 connected to the lamp housing 110 without changing the lamp driver module 130.

Meanwhile, although the first connector 117 and the second connector 113 in addition to the first line 115 and the second line 111 are separately arranged in the above embodiment, it is not limited thereto. For example, in another embodiment of the present invention, one connector may be provided instead of the first connector 117 and the second connector 113 and the one connector may include a pin corresponding to the first connector and a pin corresponding to the second connector, or a pin insertion portion corresponding to the first connector and a pin insertion portion corresponding to the second connector.

Figure 5:
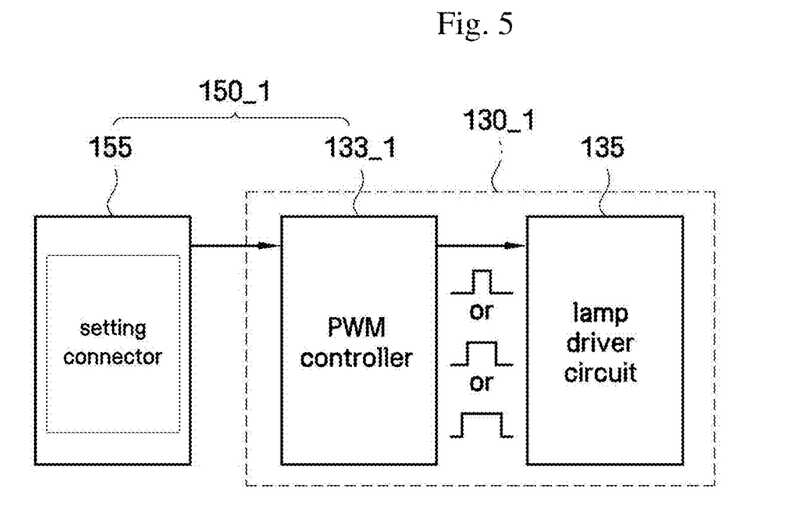
FIG. 5 illustrates an automotive lamp device in accordance with another embodiment of the present invention.

FIG. 5 illustrates an automotive lamp device in accordance with another embodiment of the present invention.

Referring to FIGS. 3 and 5, the automotive lamp device of this embodiment is different from the automotive lamp device of the above-described embodiment in that a lamp driver module 130_1 includes a pulse width modulation (PWM) controller 133_1 instead of the voltage divider circuit 133 such that the PWM controller 133_1 and the setting connector 155 form a setting unit 150_1. Specifically, in the automotive lamp device of this embodiment, in case where different types of setting connectors are connected to the lamp housing according to the specifications of the LED included in the lamp, signals having different pulse widths may be supplied to the lamp driver circuit 135. Accordingly, the lamp driver circuit 135 may supply different levels of voltages and/or currents to the lamp according to the pulse widths of the signals supplied from the PWM controller 133_1.

Meanwhile, although not shown in the drawing, in an automotive lamp device in accordance with still another embodiment of the present invention, the lamp driver module may include a frequency modulator instead of the voltage divider circuit unlike the above-described embodiment. Specifically, in the automotive lamp device of this embodiment, in case where different types of setting connectors are connected to the lamp housing according to the specifications of the LED included in the lamp, signals having different frequencies may be supplied to the lamp driver circuit. Accordingly, the lamp driver circuit may supply different levels of voltages and/or currents to the lamp according to the frequencies of the signals supplied from the frequency modulator.

Figure 6:
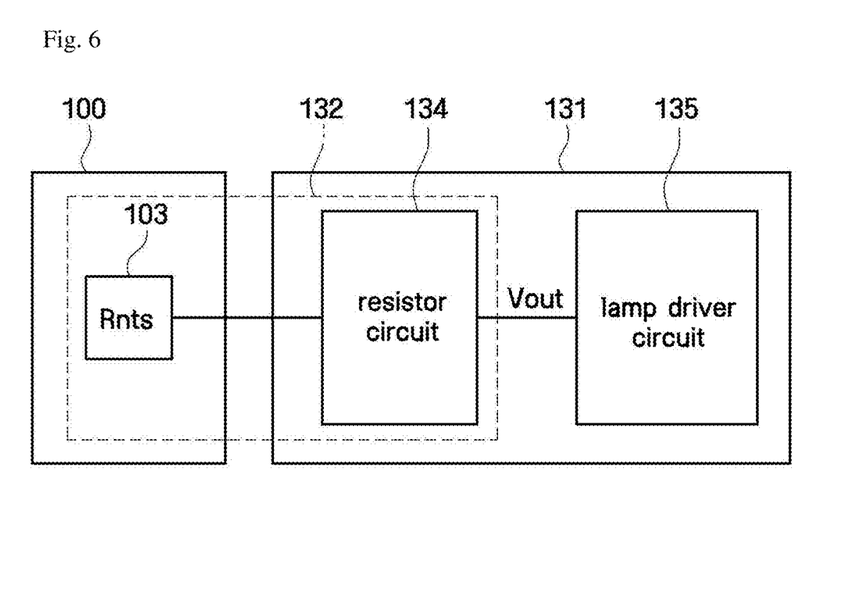
FIG. 6 illustrates an automotive lamp device in accordance with still another embodiment of the present invention.
Figure 7A:
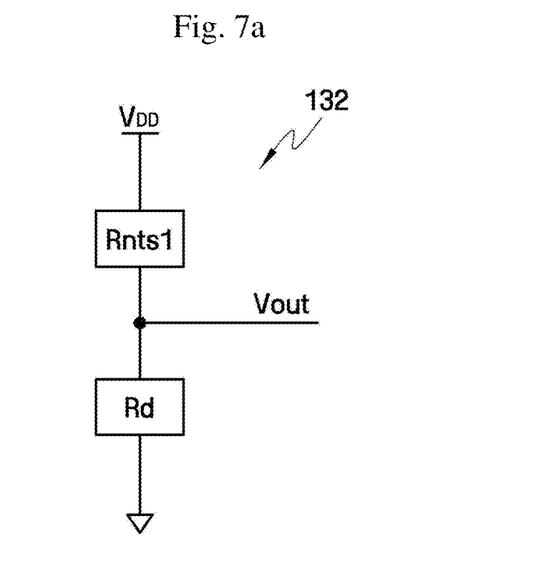
FIGS. 7A and 7B are exemplary diagrams for explaining a voltage divider of FIG. 6.
Figure 7B:
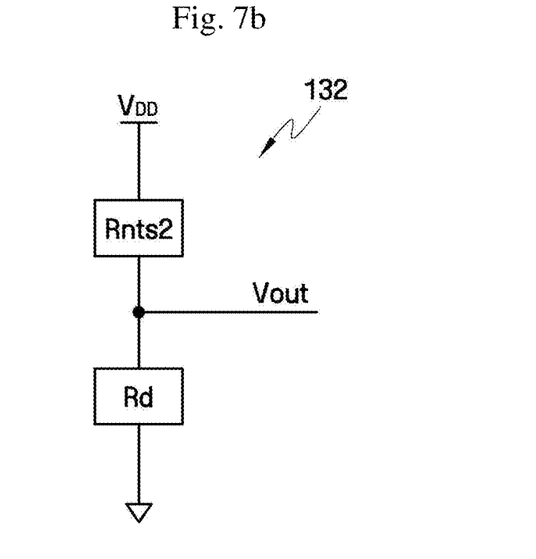

FIG. 6 illustrates an automotive lamp device in accordance with still another embodiment of the present invention. FIGS. 7A and 7B are exemplary diagrams for explaining a voltage divider of FIG. 6.

Referring to FIGS. 3 and 6, the automotive lamp device of this embodiment may not include the setting connector unlike the automotive lamp device of the above-described embodiment. Further, the automotive lamp device of this embodiment is different from the automotive lamp device of the above-described embodiment in that a resistor circuit 134 in a lamp driver module 131 and a negative temperature coefficient (NTC) resistor Rnts 103 included in the LED of the lamp 100 may form a voltage divider 132.

Specifically, LEDs having different specifications may include different levels of NTC resistors Rnts. For example, an LED having a first specification may include a first level of an NTC resistor Rnts1 as shown in FIG. 7A, and an LED having a second specification may include a second level of an NTC resistor Rnts2 as shown in FIG. 7B. Accordingly, although the resistor circuit 134 included in the lamp driver module 131 has the same resistance level, an output of the voltage divider 132 formed by both the resistor circuit 134 and the NTC resistor Rnts1 or Rnts2 may be changed according to the specification of the LED included in the lamp 100. Therefore, the lamp driver circuit 135 may supply different levels of voltages and/or currents to the light source according to the output levels of the signals supplied from the voltage divider 132.

Figure 8:
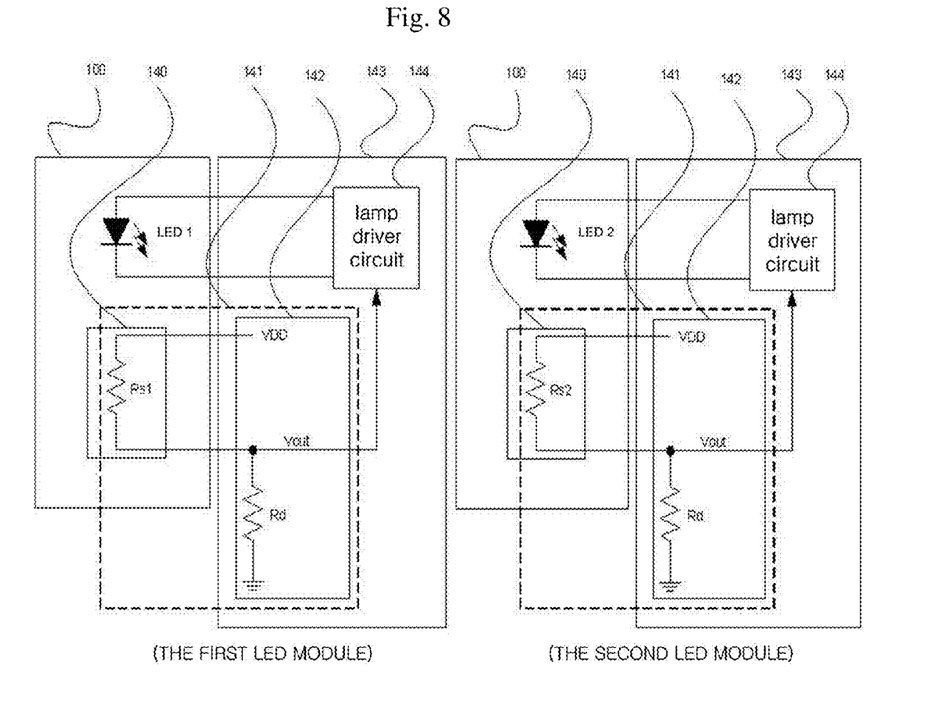
FIG. 8 illustrates an automotive lamp device in accordance with still another embodiment of the present invention.
Figure 9A:
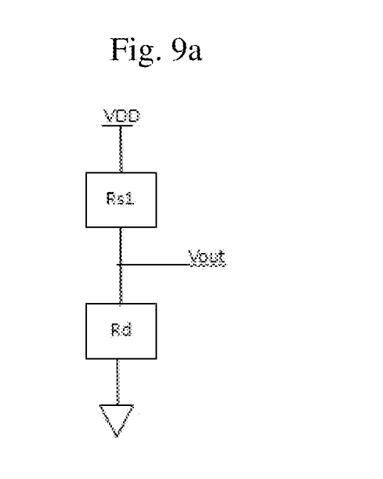
FIGS. 9A and 9B are exemplary diagrams for explaining a voltage divider of FIG. 8.
Figure 9B:
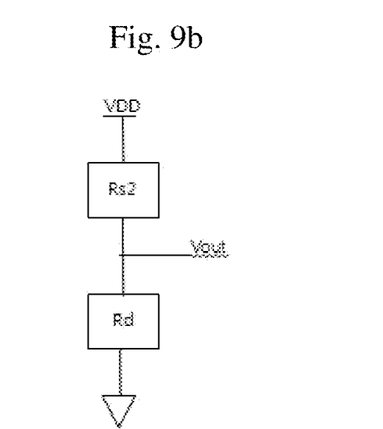

FIG. 8 illustrates an automotive lamp device in accordance with still another embodiment of the present invention. FIGS. 9A and 9B are exemplary diagrams for explaining a voltage divider of FIG. 8.

Referring to FIGS. 3 and 8, the automotive lamp device of this embodiment may not include the setting connector unlike the automotive lamp device of the above-described embodiment. Further, the automotive lamp device of this embodiment is different from the automotive lamp device of the above-described embodiment in that a resistor circuit 142 in a lamp driver module 143 and a resistor Rs for identifying the specification of LEDs included in an LED module of the lamp 100 may form a voltage divider 141.

Specifically, LEDs having different specifications may include different levels of resistors Rs. For example, an LED having a first specification may include a first level of an resistor Rs1 as shown in FIG. 9A, and an LED having a second specification may include a second level of an resistor Rs2 as shown in FIG. 9B. Accordingly, although the resistor circuit 142 included in the lamp driver module 143 has the same resistance level, an output of the voltage divider 141 formed by both the resistor circuit 142 and the resistor Rs1 or Rs2 of the lamp 100 may be changed according to the specification of the LED included in the lamp 100. Therefore, a lamp driver circuit 144 may supply different levels of voltages and/or currents to the light source according to the output levels of the signals supplied from the voltage divider 141.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. An automotive lamp device comprising:
 a lamp housing in which a first lamp including an LED light source operable at a first level of voltage or current and a second lamp including an LED light source operable at a second level of voltage or current different from the first voltage or current can be disposed at a predetermined position at different times; and
 a lamp driver module connected to the lamp housing for supplying, if the first lamp is disposed at the predetermined position of the lamp housing, to the first lamp the first level of voltage and/or current or supplying, if the second lamp is disposed at the predetermined position of the lamp housing, to the second lamp the second level of voltage and/or current, which is different from the first level of voltage and/or current, and the first operable level of voltage or current and the second operable level of voltage or current are detected by the lamp driver module.

2. The automotive lamp device of claim 1, further comprising a setting connector connected to the lamp housing and including a first setting connector and a second setting connector different from the first setting connector,
 wherein:

(a) when the first lamp is disposed at the predetermined position in the lamp housing, the lamp housing is connected to the first setting connector; and
 (b) when the second lamp is disposed at the predetermined position in the lamp housing, the lamp housing is connected to the second setting connector.

3. The automotive lamp device of claim 2, wherein the lamp driver module includes a voltage divider circuit,
 wherein:
 (a) when the first setting connector is connected to the lamp housing, the voltage divider circuit provides a first level of output such that the lamp driver module supplies to the first lamp the first level of voltage and/or current in response to the first level of output; and
 (b) when the second setting connector is connected to the lamp housing, the voltage divider circuit provides a second level of output different from the first level of output such that the lamp driver module supplies to the second lamp the second level of voltage and/or current in response to the second level of output.

4. The automotive lamp device of claim 2, wherein the lamp driver module includes a pulse width modulation (PWM) controller,
 wherein:
 (a) when the first setting connector is connected to the lamp housing, the PMW controller provides a first level of pulse width such that the lamp driver module supplies to the first lamp the first level of voltage and/or current in response to the first level of pulse width; and
 (b) when the second setting connector is connected to the lamp housing, the PMW controller provides a second level of pulse width different from the first level of pulse width such that the lamp driver module supplies to the second lamp the second level of voltage and/or current in response to the second level of pulse width.

5. The automotive lamp device of claim 2, wherein the lamp driver module includes a frequency modulator,
 wherein:
 (a) when the first setting connector is connected to the lamp housing, the frequency modulator provides a first level of frequency such that the lamp driver module supplies to the first lamp the first level of voltage and/or current in response to the first level of frequency; and
 (b) when the second setting connector is connected to the lamp housing, the frequency modulator provides a second level of frequency different from the first level of frequency such that the lamp driver module supplies to the second lamp the second level of voltage and/or current in response to the second level of frequency.

6. The automotive lamp device of claim 1, wherein the second lamp is replaced with the first lamp at the predetermined position in the lamp housing.

7. An automotive lamp device comprising:
 a lamp housing in which a first lamp including an LED light source having a first identification resistor and a second lamp including an LED light source having a second identification resistor different from the first identification resistor can be disposed at a predetermined position at different times; and
 a lamp driver module including a lamp driver circuit and a resistor circuit,
 wherein:
 if the resistor circuit is connected to the first identification resistor, the first identification resistor and the resistor circuit form a voltage divider circuit, and the voltage divider circuit supplies a first level of output such that the lamp driver circuit supplies to the first lamp a first level of voltage and/or current in response to the first level of output; and if the resistor circuit is connected to the second identification resistor, the second identification resistor and the resistor circuit form the voltage divider circuit, and the voltage divider supplies a second level of output different from the first level of output such that the lamp driver circuit supplies to the second lamp a second level of voltage and/or current, which is different from the first level of voltage and/or current, in response to the second level of output.

8. The automotive lamp device of claim 7, wherein the identification resistor is a negative temperature coefficient resistor.

* * * * *